(12) United States Patent
Pan

(10) Patent No.: US 7,640,003 B1
(45) Date of Patent: Dec. 29, 2009

(54) DETERMINING LOCATION AND SURVIVABILITY OF A CAPTIVE PERSON UNDER A DISASTER SITUATION BY USE OF A MOBILE DEVICE

(76) Inventor: Yang Pan, Shimao Riviera Garden, Wei Fang Rd. (W), Lane 1, Block 9 Unit 8A, Shanghai (CN) 200122

( * ) Notice: Subject to any disclaimer, the term of this patent is extended or adjusted under 35 U.S.C. 154(b) by 0 days.

(21) Appl. No.: 12/344,519

(22) Filed: Dec. 28, 2008

(51) Int. Cl.
*H04M 11/04* (2006.01)
*H04M 3/42* (2006.01)
*H04B 7/00* (2006.01)
*H04B 1/04* (2006.01)

(52) U.S. Cl. ............... 455/404.1; 455/404.2; 455/521; 455/414.1; 455/127.1

(58) Field of Classification Search .............. 455/404.1, 455/404.2, 414.1, 414.2, 456.1–456.3, 457, 455/41.2, 41.3, 521, 572, 574, 127.1, 127.5, 455/343.1, 343.6

See application file for complete search history.

(56) References Cited

U.S. PATENT DOCUMENTS

| | | | |
|---|---|---|---|
| 6,314,308 | B1 | 11/2001 | Sheynblat et al. |
| 6,668,179 | B2 | 12/2003 | Jiang |
| 7,058,409 | B2 | 6/2006 | Hanninen et al. |
| 7,251,470 | B2 | 7/2007 | Faucher et al. |
| 2003/0129977 | A1 | 7/2003 | Dolwin |
| 2004/0224659 | A1 | 11/2004 | Cheng |
| 2004/0263338 | A1 | 12/2004 | Katz |
| 2004/0266349 | A1 | 12/2004 | Wang |
| 2005/0037730 | A1 | 2/2005 | Montague |
| 2006/0216103 | A1 | 9/2006 | Vehal et al. |
| 2007/0004379 | A1 | 1/2007 | Stanners |
| 2007/0268108 | A1 | 11/2007 | Weinberg et al. |
| 2007/0270164 | A1 | 11/2007 | Maier et al. |
| 2009/0174547 | A1* | 7/2009 | Greene et al. .......... 340/539.13 |

* cited by examiner

*Primary Examiner*—Eugene Yun
(74) *Attorney, Agent, or Firm*—Yang Pan

(57) ABSTRACT

A mobile computing and communication device for an emergency occasion is disclosed. The device, for example, is useful for a trapped person under a mound of debris created by a fallen building during an earthquake or a terrorist attack. The invention is based upon a conventional mobile communication device with an additional communication unit. The additional unit is based upon a short-range and ad hoc communication network. The invention is characterized by that a power management unit is used to monitor the remaining power of a battery system for the mobile device. If the power is below a preset threshold value, the main function of the mobile device as a mobile phone is switched off and the reserved power is used to supply energy for the second communication unit, which typically consumes much less power and lasts for very long time. An authorized signal delivered by a nearby mobile rescue station will switch on the mobile device to provide the information with regard to trapped person's identity, location and status. A sensory unit such as an accelerometer and/or a gyroscope may detect a signal if the person touches and/or moves the device after receiving a triggering signal.

15 Claims, 6 Drawing Sheets

DETERMINING LOCATION AND SURVIVABILITY OF A CAPTIVE PERSON UNDER A DISASTER SITUATION BY USE OF A MOBILE DEVICE

CROSS-REFERENCE TO RELATED APPLICATIONS

Not applicable.

BACKGROUND OF THE INVENTION

1. Field of Invention

This invention relates to a mobile computing and communication device, specifically to a device and method for determining location and survivability of a captive person under a disaster situation by the use of the mobile device.

2. Description of Prior Art

A person may encounter many different dangerous situations during his or her life. For example, a person may be trapped under a mound of debris created by a fallen building during an earthquake or a terrorist attack. A rescue team is sent to fallen building to search for survivors. It is important for the rescue team to identify the location and status of the trapped person to save the person's life effectively. Although a mobile phone is becoming a popular handheld device, it may not be an effective communication device under a disaster situation. For example, the communication network may be destroyed during an earthquake. Further, a rescue task may take more than 1-2 weeks for a disaster such as an earthquake. The battery of the mobile phone may run out of power in a couple of days for most of devices.

Therefore, it is desirable to have a device and method based upon a popular handheld device such as a mobile phone for locating a trapped person and for determining his or her status under a disaster situation for a prolonged period of time after the incident. This allows a rescue team to have more opportunities to save a person's life.

SUMMARY OF THE INVENTION

In an exemplary embodiment, a mobile phone is used to illustrate the inventive concept, which should not limit the scope of the present invention. The inventive concept can be extended to other mobile devices such as handheld media players, PDA (Personal Digital Assistant) and digital cameras. In one implementation, the mobile phone may further include second communication device such as a ZigBee transceiver in one implementation. The ZigBee is a short range communication standard conforming to IEEE 802.15.4 and its amendments. The ZigBee device is operated under much lower power consumption than the mobile phone.

A power management unit is used to measure the remaining power of a battery for the mobile phone. If the power is below a preset threshold value such as for example 10% of the maximum power, the mobile phone is switched off. The operation is almost transparent to a user of the mobile phone as long as the reserved power is a small portion of the battery power. The reserved power is used to supply the required power for the communication of the ZigBee device with an external device through an ad hoc communication link or network. The reserved power is able to support the operation of the ZigBee device for a significantly longer period of time.

The ZigBee device operated under the reserved power mode may check, in a regular interval, if authentic external signals are received. A mobile rescue station equipped with a communication device is operated by a rescue personnel or team. The communication device is conforming at least to the same communication standard as the ZigBee device. The mobile rescue station sends authorized signals to the ZigBee device of the trapped person in an emergency occasion. The authority for granting a permission of delivering such emergency signals to switch the mobile phone into an emergency lifesaving device may only be from a government agency. The ZigBee device switches on selected functions of the mobile device after receiving the triggering (authorized) signals. The selected functions may include a bi-directional communication functionality of the ZigBee device, a sensory unit for detecting the status of the trapped person. The sensory unit may be an accelerometer and/or a gyroscope integrated with the mobile phone. The selected functions may further include required data processor. The mobile phone may then deliver a notable event of vibration of the device or a ring tone to the trapped person. The mobile phone receives a signal from the sensory unit if the person interacts with the mobile device by touching or moving the device. The ZigBee device may send a data file, including data collected from the sensory unit and personal data stored in the storage of the mobile phone, to the rescues mobile station.

The rescue station may decide the person's status by analyzing the received data file. The location of the trapped person may be determined by switching on a GPS device in the mobile phone. The location may also be determined by a zonal method related to the ad hoc network formed by a number of ZigBee devices. Disposable devices with ZigBee communication capability may be deposited at selected locations to form existing ZigBee nodes. The location of the trapped person with the mobile phone, including ZigBee transceiver, may be determined based upon its relationship the existing nodes. The method can be extended to a case of multiple persons and multiple rescue stations in a significant disaster situation.

BRIEF DESCRIPTION OF THE DRAWINGS

For a more complete understanding of the present invention and its various embodiments, and the advantages thereof, reference is now made to the following description taken in conjunction with the accompanying drawings, in which.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
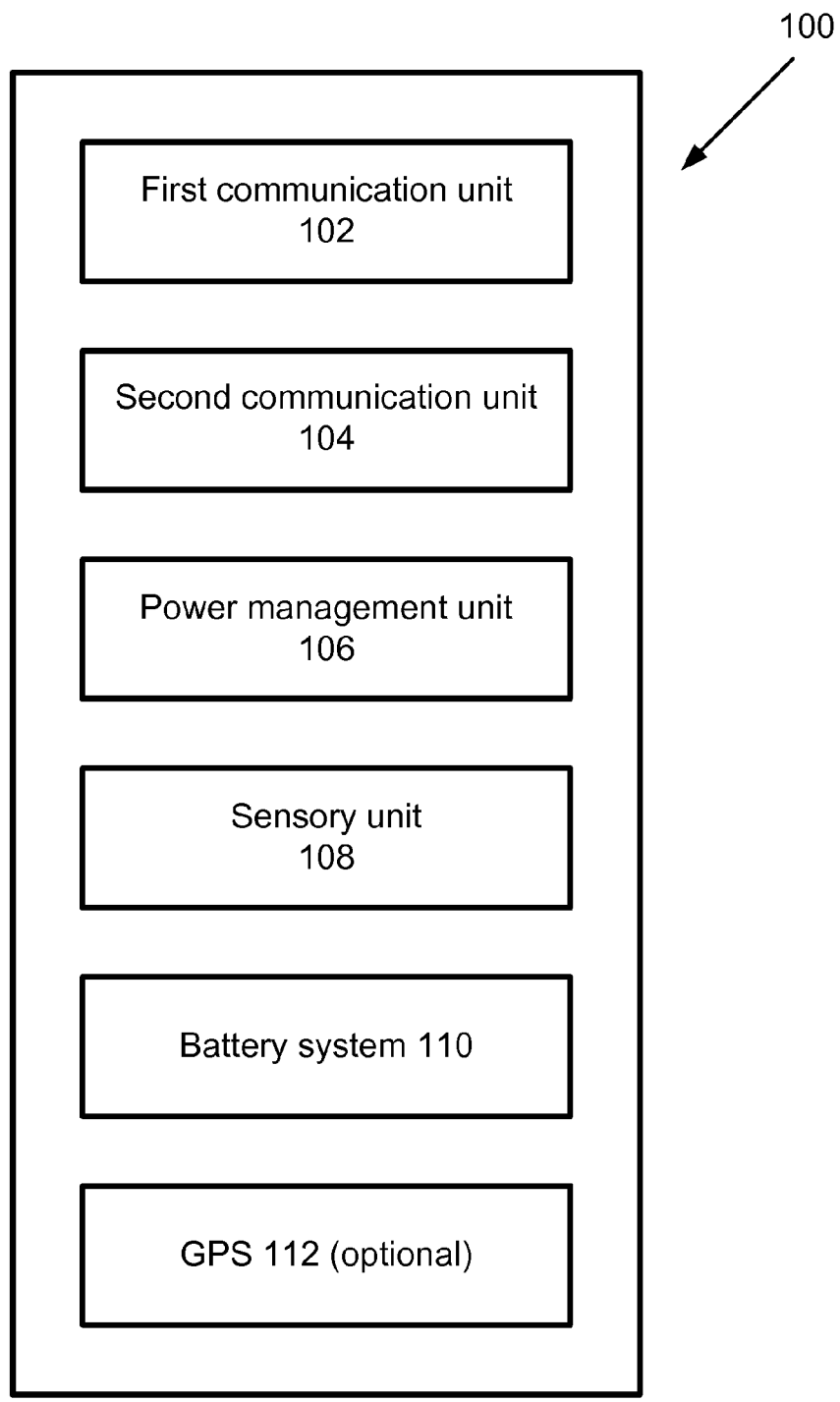
FIG. 1 is a schematic diagram of a mobile device illustrating the present invention.

FIG. 1 is a schematic diagram of a mobile device 100 as an illustration of the present invention. The mobile device 100 includes a first communication unit 102. According to one implementation, 102 is a mobile phone except that a battery system is shown separately in the figure. The unit may conform to one of or a combination of the existing mobile phone communication standards such as, for example GSM, CDMA and 3 G of a public telephone system. The mobile device 100 further includes a second communication unit 104. In accordance with one implementation, 104 is a short range communication device. It may form an ad hoc communication network with other similar devices. The short range communication device consumes typically much less power than a mobile phone. A power management unit 106 is used to control the power flow. The mobile device 100 further includes a sensory unit 108 and a battery system 110.

The battery system 110 supplies power to enable the operations of the first communication device 102. The mobile device is based upon a mobile phone according to one embodiment. The power management unit 106 is used to monitor the consumption of the power of the battery system 110. The remaining power of the battery system is measured by 106. If the power is below a preset threshold, the power management unit 106 switches off the power supply for the operations of the first communication unit 102 and delivers the power to enable the operations of the second communication unit 104. The threshold may be pre-determined by the system provider. The threshold may be adjusted by the user of the mobile device. A threshold value preset at 10% of the maximum power, for example, will not cause significant inconvenience for the user of the mobile device 100 when it is used as a mobile phone.

The battery system 110 may comprise a single piece of the battery. The battery system may also comprise a main battery and an auxiliary battery. The main battery is used to enable the operations of the first communication unit 102 and the auxiliary battery for the second communication unit 104. In such a two-battery implementation, both batteries are charged during a battery charging operation. Further, the auxiliary battery may not be removable from the mobile device.

If a trapped person switches off the mobile device 100 proactively, the reserved power for the second communication device 104 and subsequently operations related to detecting the person's status and communication with the external device may exceed the preset value. When a mobile rescue station equipped with a communication device attempts to contact the trapped person, it sends out authorized signals. After receiving the authorized signals, the second communication unit 104 sends a signal to switch on the sensory unit 106. An event of notable vibrations and/or a ring tone are delivered to the trapped person through the mobile device 100. The interaction or non-interaction of the person with the mobile device 100 results in signals collected by the sensory unit 106. The second communication unit 104 sends the collected signals to the mobile rescue station. The user's location may be determined by a GPS (Global Positioning System) unit 112. The user's location may also be derived based upon a zonal method of the ad hock network.

Figure 2:
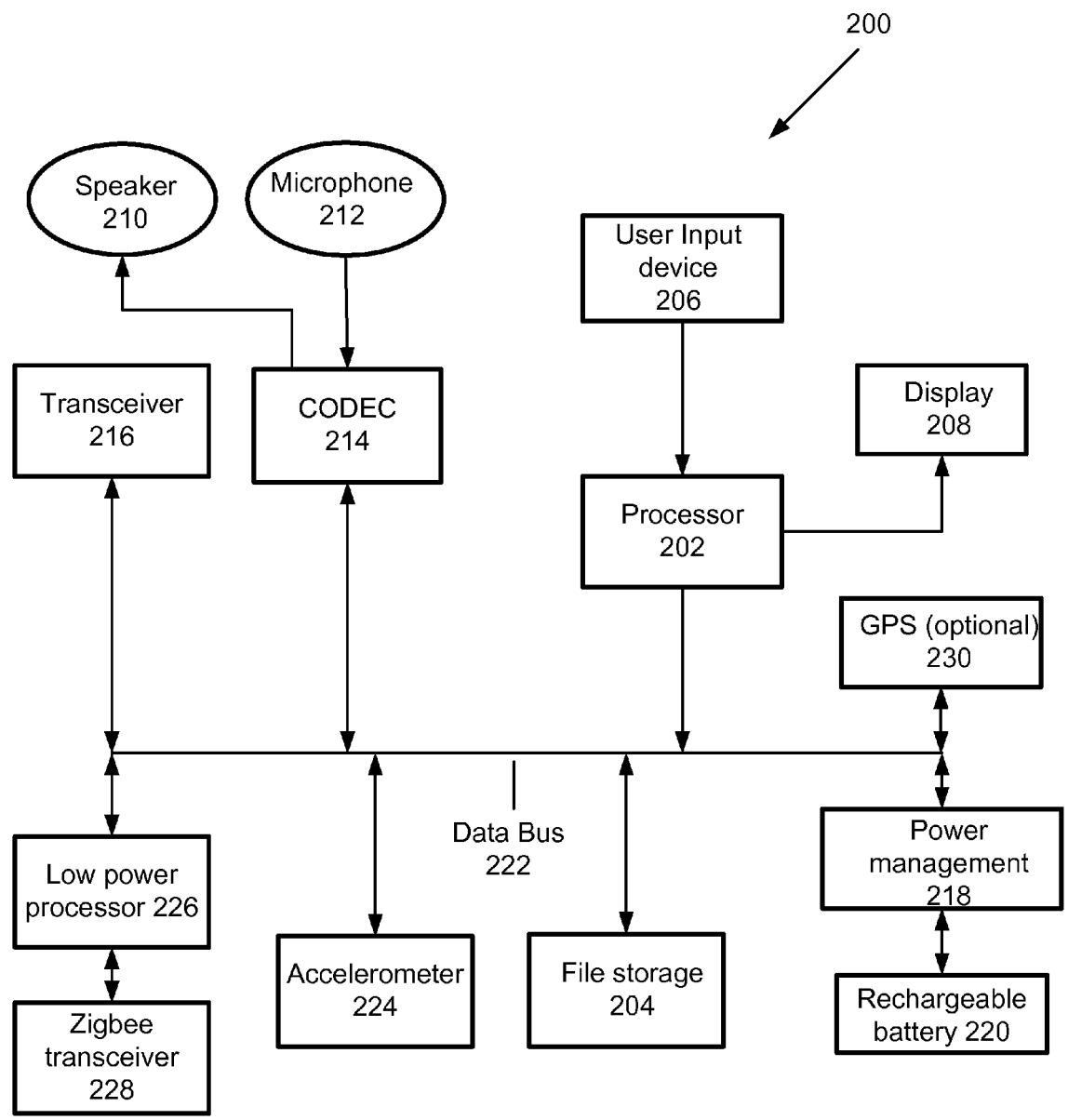
FIG. 2 is a schematic functional block diagram of one embodiment of the present invention based upon a mobile phone, a ZigBee transceiver and an accelerometer.

An exemplary illustration of the mobile device is shown in FIG. 2. The device 200 includes a processor 202 that pertains to a microprocessor or a controller for controlling the overall operation of the mobile device 200. The processor may also include a DSP (Digital Signal Processor). The file storage system 204 is, typically, a flash memory or a plurality of flash memories. The file system 204 may also include a cache, for example, a Random-Access Memory (RAM) provided by semiconductor memory. The relative access time to the cache is substantially shorter than for the Flash memories. The mobile device 200 also includes a user input device 206 that allows a user to interact with the device. For example, the user input device 206 can take a variety of forms, such as a button, keypad, dial, etc. The mobile device 200 includes a display 208 (e.g., Liquid Crystal Display) that can be controlled by the processor 202 to display information to the user. The mobile device 200 also includes a speaker 210 and a microphone 212 both are connected to a coder/decoder (CODEC) 214. The CODEC 214 converts digital signals into analog ones for the speaker. It also serves function to receive the analog signals from the microphone and converts to digital signals for further processing by the processor 202.

The mobile device 200 further includes a transceiver 216 for transmitting and receiving signals and for communicating with an external device through an existing communication network. The network may be based upon GPS, CDMA, 3 G and any other existing wireless communication standard of a public telephone system. The mobile device is powered by a rechargeable battery 220 through a power management unit 218. The various units may be connected to a data bus 222. A sensory unit is an accelerometer and/or gyroscope 224 in the current implementation. Silicon based accelerometer and/or gyroscope has been used in mobile device to enhance its functionality such as in iPhone from Apple Inc.

In another implementation, 224 may be an infrared sensor, which may be used to detect body temperature of a nearby human body and to determine the survival status of a person. In yet another implementation, the microphone 212 may be used to receive voice message from the user and 224 may be eliminated.

The mobile device 200 includes the second communication unit that is taken as a ZigBee transceiver 228 as an exemplary case as shown in the figure. A low power processor 226 may be added to manage the device operation after the first communication unit and main portion of the device are switched off. ZigBee is the name of a specification for a suite high level communication protocols using small, low-power digital radios based on the IEEE 802.15.4 standard for wireless personal area network (WPANs). The technology is intended to be simpler and less expensive than other WPANs, such as Bluetooth (IEEE 802.11b). ZigBee is targeted at radio frequency (RF) applications that require a low data rate, long battery life, and secure networking.

The mobile device 200 may also include a GPS unit 230 as an option to determine the location of the trapped person. Alternatively, the location can be determined by a zonal method for an ad hoc network formed by multiple ZigBee devices.

Figure 3:
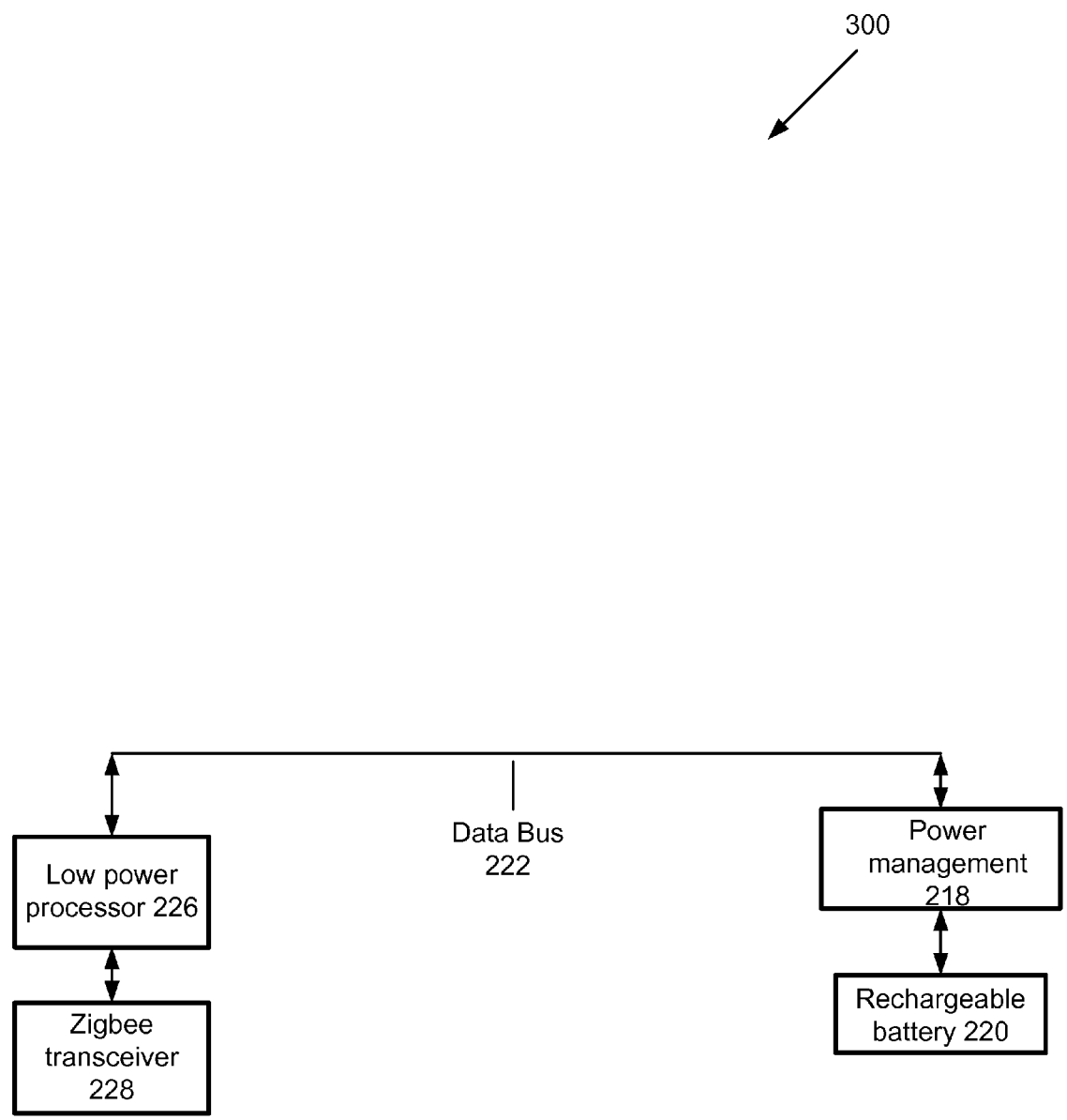
FIG. 3 is a schematic functional block diagram of the mobile device operated under a low power mode with the ZigBee device receiving the signals from an external device.

When the device 200 is operated as a conventional mobile phone, the battery power is delivered to supply the required power for the operation. 226/228 for the second communication means may be switched off. The power management unit 218 is used to monitor remaining power of the battery 220. If the battery power is below a preset threshold such as, for example, below 10% of the maximum power of the battery, the mobile phone is switched off. The second communication unit is then switched on with a power supplied from the battery 220 as shown in FIG. 3. The device 300 is the mobile device on a low power operation mode. "It should be noted that the second communication unit is preferably operated as a receiver only to reserve the battery power before an authorized signal is received." The device checks, in a regular interval, if authorized signals are received from an external device. Although a low power processor 226 is explicitly shown in the figures, it may not be a separate unit. It may be the processor 202 operating at low power mode. It may also be in a single chip integration form with the ZigBee transceiver 228.

Figure 4:
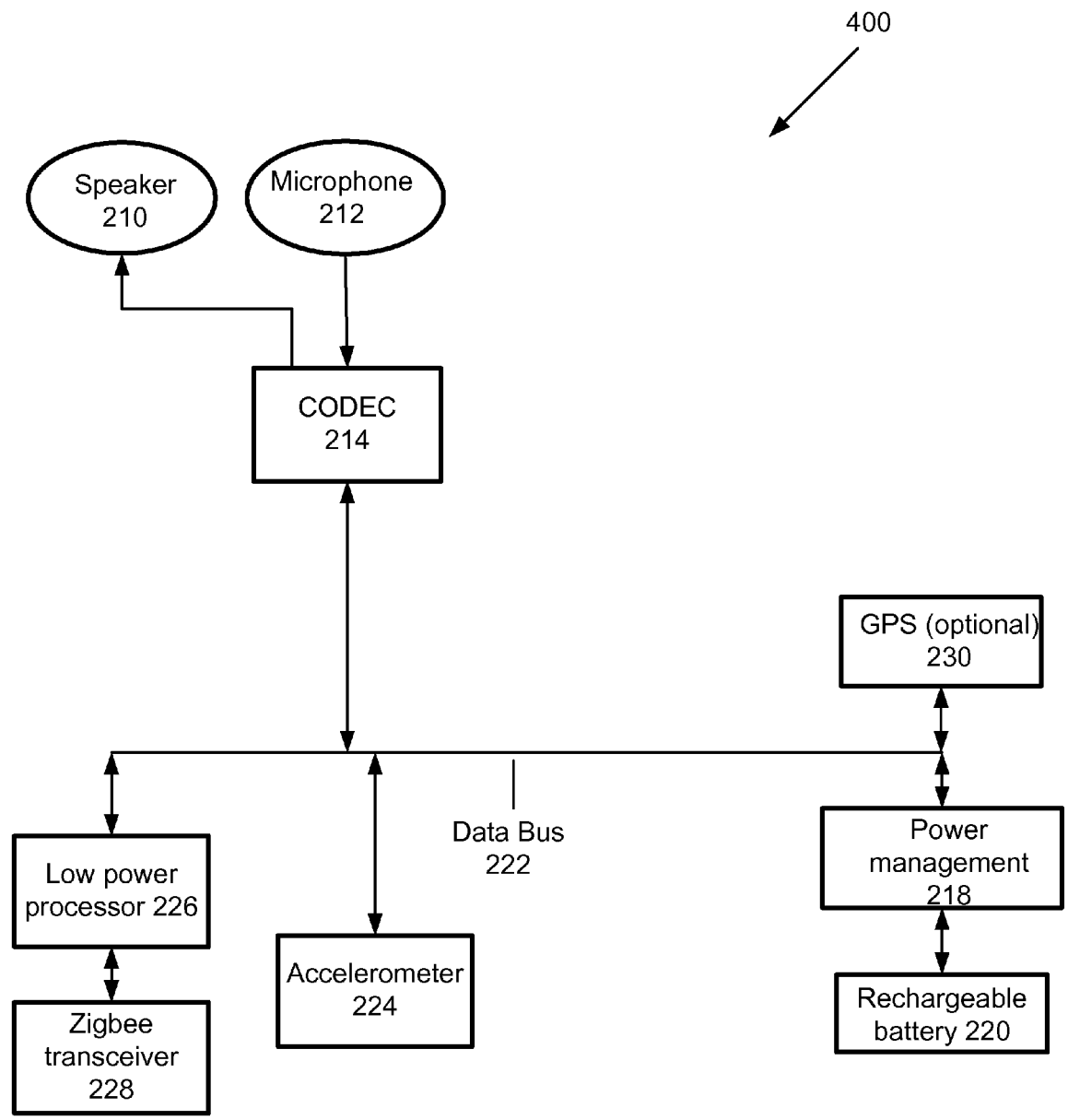
FIG. 4 is a schematic functional block diagram of the mobile device after receiving authorized signals. The mobile device is used to collect the trapped person status and communicate with the external device.

After the authorized signals are received by the ZigBee transceiver, the low power processor 226 switches on the accelerometer 224, the GPS 230 (optional) and the voice processing blocks (210, 212 and 214). The GPS unit 230 is not required if the location of the trapped person is determined by the zonal method. Further, the voice processing block may also not essential in the operation illustrated by the device 400. The authorized signals may be sent from a mobile rescue station comprising a communication device conforming to the ZigBee standard. The permission of delivery of the authorized signals may only be granted by a government agency. It can only be used, for example, under a nature disaster or under a terrorist attack. It may be a software key to unlock the mobile device to operate as the emergency communication and data collection system as illustrated in FIG. 4. After receiving the authorized signals, the processor 226 sends a command that the mobile device will deliver vibration signals or a ring tone to the trapped person. The accelerometer 224 receives a signal if the person touches or moves the device after notifying the alert signals. The collected signal will be sent back to the mobile rescue station for analyzing the status of the person. In the same time, the personal identity and/or other personal data may also be read out and be sent to the rescue station. The personal data may be stored in a memory in the same chip as the Zigbee transceiver. It may also be stored in the file storage system of the mobile device.

Figure 5:
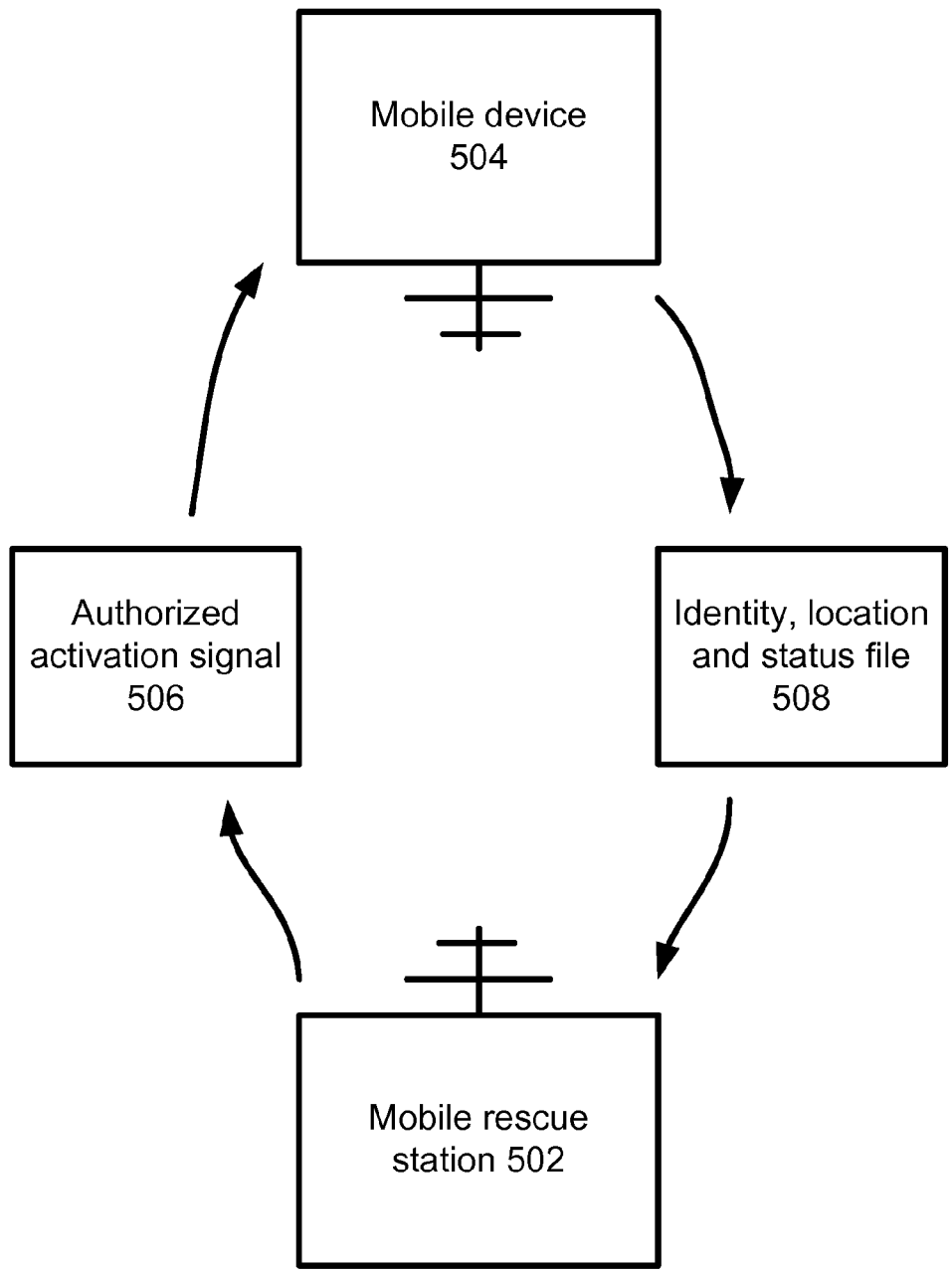
FIG. 5 shows a schematic diagram that the mobile rescue station sends authorized signals to the mobile device and triggers the operation of the device as a lifesaving device.

The interaction between the mobile rescue station 502 and the mobile device 504 is further illustrated in FIG. 5. The mobile rescue station 502 sends the authorized signal 506 to the mobile device 504. The mobile device 504 then sends back a file 508 to the rescue station 502 which may comprise the person's identity, the person's survival status represented by the signals collected from the sensory unit and the location detected from the GPS (optional). Although one rescue station and one mobile device are shown in the figure, the inventive concept can be extended to multiple mobile devices and multiple rescue stations. In the case that the zonal method is used to determine the person's location, multiple disposable communication devices including ZigBee transceivers may be used to form existing nodes of the ad hoc network. Locations of trapped persons associated with the respective Zigbee device may be determined based upon their relationship with the existing nodes.

Figure 6:
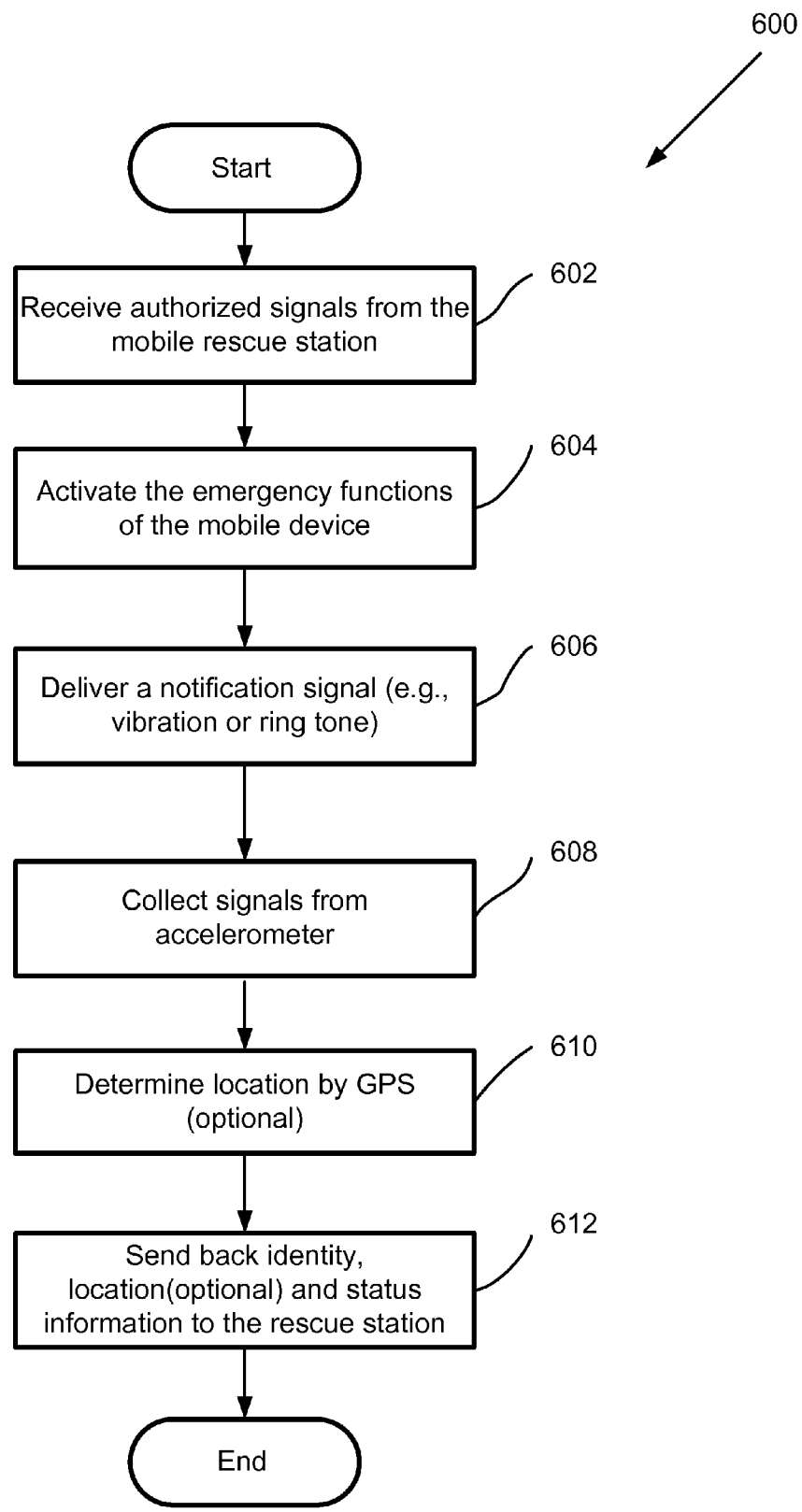
FIG. 6 shows a flow diagram of the operation that the mobile device is used to collect the status of the trapped person and to communicate with the mobile rescue station.

FIG. 6 shows a flow diagram for a process 600 that the mobile rescue station 502 communicating with the mobile device 504. The process begins with a step 602 that the authorized signals are received by the mobile device 504 from the mobile station 502. After receiving the signals, the mobile device 504 activates the emergency functions in step 604. A notification signal in the form of vibration and/or ring tone is delivered to the trapped person in step 606. The trapped person touches or moves the mobile device will send a signal to the accelerometer or the gyroscope. In step 608, the signal or no signal is collected by the sensor (s) depending on the person's interaction with the mobile device. The person's location may be determined in step 610 by the GPS. Alternatively, the location may be determined by the Zonal method. In step 612, the person's identity which is read out from a storage device in the mobile device, the location measured by GPS (optional) and the status information collected by the sensory unit are sent back to the rescue station 502.

The invention claimed is:

1. A handheld mobile computing and communication device powered by a battery system for use at least as a mobile phone in a normal operation mode and for use as a survivability detecting device when a person is trapped in a disaster situation, the device comprising:
   (a) a first communication unit providing a means for communicating with another communication device through a public telephone network;
   (b) a second communication unit providing a means for communicating with another communication device through an ad hoc communication network after said first communication unit is powered off;
   (c) an accelerometer/gyroscope for detecting motion of said device induced by the trapped person; and
   (d) a power management unit comprising:
      a means for supplying power for the first communication unit in a normal operation;
      a means for measuring remaining power of the battery system in a normal operation;
      a means for switching off power supply to the first communication unit if the measured power is below a predetermined value;
      a means for supplying power for said second communication unit after said first communication unit is powered off; and
      a means for supplying additional power to activate said accelerometer/gyroscope if an authorized external signal is received by said second communication unit,
   whereby said power management unit enables said device to operate for a prolonged period of time by efficiently utilizing the reserved battery power while the trapped person is waiting for the rescue, which maximizes the opportunity that a trapped person is rescued in a disaster situation such as after an earthquake or a terrorist attack.

2. The device as recited in claim 1, wherein said handheld mobile computing and communication device is contained in a single case.

3. The device as recited in claim 1, wherein said device further including:
   a GPS (Global Positioning System) for determining the location of said device.

4. The device as recited in claim 1, wherein the second communication unit comprising a short range communication device, for providing said ad hoc communication means, conforming to a standard or a combination of standards from the following group:
   ZigBee (IEEE 802.15.4 and its amendments);
   Bluetooth (IEEE 802.11b and its amendments);
   WiFi (IEEE 802.11 and its amendments); and
   RFID (Radio Frequency Identification).

5. The device as recited in claim 1, wherein said authorized external signal is from a mobile rescue station comprising a communication device at least conforming to the same communication standard (s) as the second communication unit of the mobile device.

6. The device as recited in claim 1, wherein said second communication unit further comprising a means for a low power operation as a receiver only before the authorized external signal is received.

7. The device as recited in claim 1, wherein said second communication unit is operated as a transceiver after the authorized external signal is received.

8. The device as recited in claim 1, wherein said battery system comprising a main battery and an auxiliary battery.

9. The device as recited in claim 8, wherein said auxiliary battery is exclusively used for the second communication unit, accelerometer/gyroscope and other said function blocks for the emergency use.

10. A method of communication between a handheld mobile computing and communication device associated with a trapped person and a mobile rescue station associated with a rescue team, wherein the mobile device comprising a first communication unit for communicating through a public telephone network, a second communication unit for communicating through an ad hoc communication network, an accelerometer/gyroscope, a battery system, and functional blocks for delivering an event of notable vibration and/or a ring tone, the method comprising the steps of:
  (a) switching off the power supply from the battery system to said first communication unit;
  (b) switching on the power supply from the battery system to support the operation of said second communication unit;
  (c) operating said second communication unit under a low power mode as a receiver only;
  (d) receiving an authorized signal from the mobile rescue station;
  (e) switching on the accelerometer/gyroscope and said functional blocks;
  (f) delivering alert signals including an event of notable vibrations and/or a ring tone;
  (g) measuring signals generated from the accelerometer and/or gyroscope in a predetermined frequency; and
  (h) operating the second communication unit as a transceiver and transmitting the measured signals to the mobile rescue station.

11. The method as recited in claim 10, wherein said second communication unit comprising a short range communication device conforming to a standard or a combination of standards from the following group:
  ZigBee (IEEE 802.15.4 and its amendments);
  Bluetooth (IEEE 802.11b and its amendments);
  WiFi (IEEE 802.11n and its amendments); and
  RFID (Radio Frequency Identification).

12. The method as recited in claim 10, wherein the mobile rescue station comprising a communication device at least conforming to the same communication standard (s) as the second communication unit of the mobile device.

13. The method as recited in claim 10, wherein said mobile computing and communication device further including a GPS (Global Positioning System) for determining the position of the trapped person.

14. The method as recited in claim 10, wherein said mobile computing and communication device further comprising a microphone and the survivability of the trapped person is determined by receiving voice signals triggered by the trapped person and by subsequently transmitting the signals to the rescue station by said second communication unit.

15. The method as recited in claim 10, wherein said mobile computing and communication device further comprising an on-board infrared sensor and the survivability of the trapped person is determined by receiving signals induced by the trapped person and by subsequently transmitting the signals to the rescue station by said second communication unit.

* * * * *